United States Patent Office 3,397,277
Patented Aug. 13, 1968

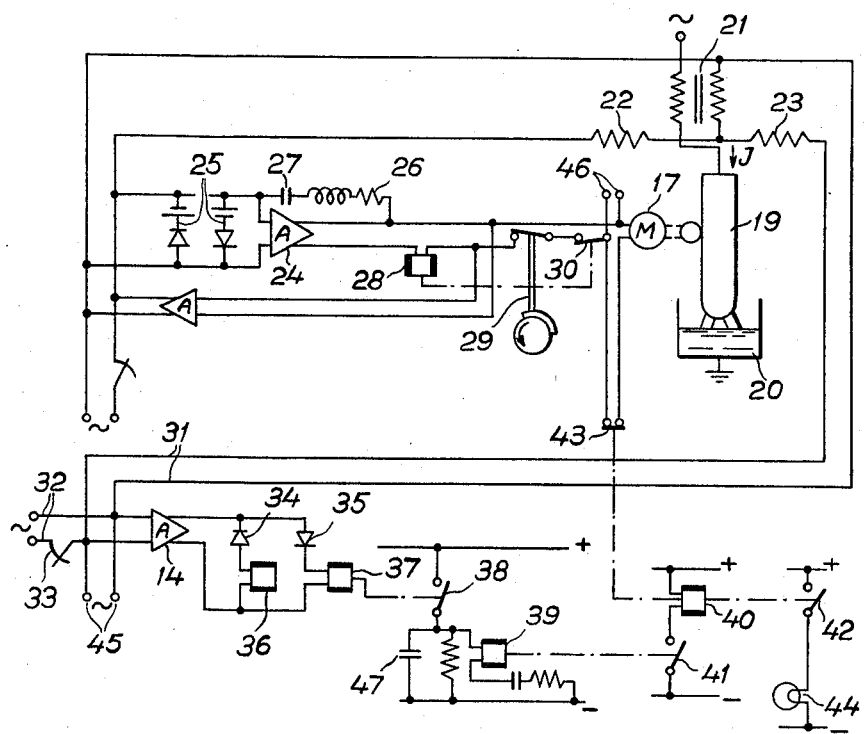

3,397,277
DEVICE FOR INDICATING ABNORMAL OPERATING CONDITIONS IN ELECTRODE FURNACES
Erik Helsing and Nils-Erik Strom, Vasteras, Sweden, assignors to Allmanna Svenska Elektriska Aktiebolaget, Vasteras, Sweden, a corporation of Sweden
Continuation of application Ser. No. 486,972, Sept. 13, 1965. This application Nov. 1, 1966, Ser. No. 591,337
Claims priority, application Sweden, Mar. 2, 1962, 2,311/62
2 Claims. (Cl. 13—13)

ABSTRACT OF THE DISCLOSURE

In an arc furnace having a motor for adjusting the position of an electrode, a variable magnitude of the furnace is measured and compared with a reference magnitude. An amplifier emits signals when there is a difference between the reference signal and the measured signal. Time delay means connect the amplifier with the control means for the motor. A continuous output signal is furnished from the amplifier when the measured value is either greater or less than the reference value, and the time delay means are started in response to either of such conditions, and act to stop the motor after a predetermined time if such signals continue.

---

The application is a continuation of application Ser. No. 486,972, filed Sept. 13, 1965, which in turn is a continuation-in-part of application Ser. No. 262,706, filed Mar. 4, 1963, both of said applications being now abandoned.

The invention relates to a device for use in the regulation of electrode furnaces, such as reduction furnaces, by means of electrode movement in accordance with certain measured values, such as current, impedance or resistance. In certain types of reduction furnaces abnormal operating conditions sometimes arise which cause a substantial change of the resistance. With automatic regulation to ensure constant current, impedance or resistance, a considerable regulation is obtained under such operating conditions, with changing of the electrode position in order to maintain the regulated magnitude constant. This is generally not desirable for two reasons. Partly an unnecessary electrode movement may worsen the condition, partly the abnormal operating condition can often only be eliminated by metallurgical means. A problem is thus to prevent such long-running electrode movement without for that reason giving up the advantages of electrode regulation.

An example of furnaces where such operating problems may arise is electric flowing furnaces, where so-called "slag boiling" may arise, causing a substantial raising of the resistance and lowered electrode current. With automatic electrode regulation a considerable downward movement of the electrode is obtained in this case, a phenomenon which it is desirable to avoid for the reason that such a downward movement generally worsens said abnormal operating condition, which can only be eliminated by metallurgical means.

The invention is aimed at a solution of these and other rather similar problems in connection with electrode furnaces and is characterised in that the duration or amount of each electrode movement is arranged to be measured by means of a measuring means which is arranged to give a signal after a certain measuring value for each electrode movement which value is preferably adjustable. Said signal may block an automatic electrode regulating device and possibly also disconnect the adjusting motor of the electrode. Although the abnormal phenomena make themselves known by longer duration or amount of each electrode movement it is in this way possible to obtain a signal, which calls the attention of the furnace attendant to the situation. Thereby necessary metallurgical or other measures may be carried out in good time. It is also possible upon such a signal automatically or manually to stop the electrode movement.

Figure 1:
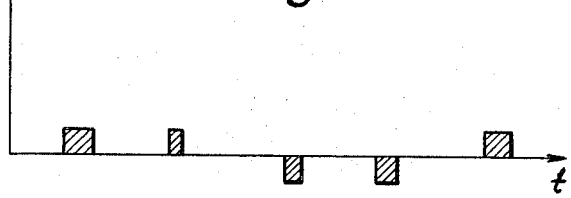
Figure 2:
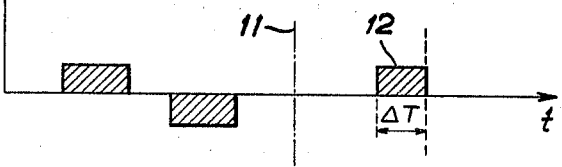
Figure 3:
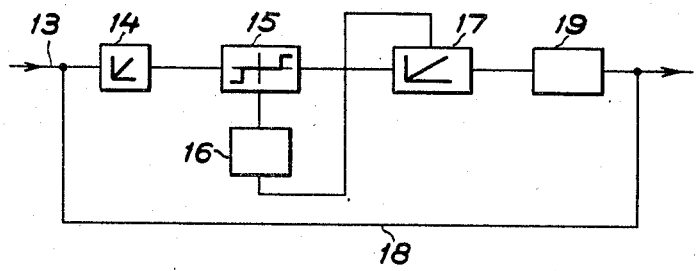

The invention is illustrated in the accompanying figures, of which FIGURE 1 shows a diagram, electrode speed-time under normal operating conditions. FIGURE 2 shows the same under abnormal operating conditions, partly without and partly with the use of the invention. FIGURE 3 shows a blocking circuit for electrode regulation according to the invention. FIGURE 4 shows the circuit of FIGURE 3 in more detail.

In FIGURE 1 is shown the electrode movement (in mm./s.) under a normal regulating process. Blocks directed upwards represent electrode raising, those directed downwards electrode lowering. With the normal furnace operation shown in FIGURE 1 the movements may in no event have an extension in time exceeding a certain definite time. In this case the duration (in seconds) of each electrode movement is measured, but one can also measure the movement (or integrate the speed of movement), for example with variable speeds of movement. Following a diagram according to FIGURE 1 a certain suitable maximum value may be defined which in all cases exceeds the connection times occurring in FIGURE 1 (normal operating conditions).

In FIGURE 2 is shown an abnormal regulating process partly without (to the left of the dotted line 11) and partly with a connected measuring and regulating device according to the invention. An abnormal phenomenon, for example "slag boiling" in a flowing furnace, makes itself known as a regulating movement with longer duration (and/or longer movement). To the right of the line 11 is shown a measuring of the duration of an electrode movement (see 12), and after a certain set time (T) or movement (mm./s.) a signal is given (acoustic or optical) and possibly a regulating signal may also issue from the measuring means (not shown in FIGURES 1 and 2) to another means for stopping the electrode movement, for example blocking of the electrode regulation or breaking of the current supply to the electrode adjusting motor. This signal may of course be amplified in a suitable way. After such a signal the furnace attendant may put into effect necessary measures in the furnace for improving the abnormal condition. The device may be multiplied for an electrode furnace, for example one per electrode, or also a common device may be used for the whole furnace. Several signal means per electrode may also be used, for example, one pre-warning signal, one action signal and an extra warning signal.

A simplified block scheme for a device according to the invention is shown in FIGURE 3. At 13 a reference value is fed in which is compared with the measuring value for the regulating magnitude, such as current, resistance, impedance. The out-signal of this is fed to an amplifier 14, which in its turn feeds an auxiliary member 15, such as an auxiliary relay, which in its turn operates the adjusting motor 17 of the electrode 19. According to the invention the auxiliary member 15 also operates a time means 16, such as a time relay, which, after a certain set value is reached, is arranged to block the regulating circuit at different places, for example according to the drawing at 17. The circuit is re-connected at 18 and in a suitable way adjusts the time relay 16 to zero after the completion of each electrode movement. The running time of the time relay is thus compared with the running time of the electrode.

The regulating circuit of FIGURE 3 is shown in more detail in FIGURE 4. An arc furnace 19, 20 with electrodes 19, for example a three-phase furnace with three electrodes 19, each of which is adjusted by an electrode adjusting motor 17 (see also FIGURE 3) is shown (one phase) in FIGURE 4. Some value in said furnace (one phase of which is shown in FIGURE 4) is measured, here furnace current I, and a signal proportional to said value is fed over a current transformer 21 and impedances 22 and 23 to the input side of each of two amplifiers 24, 14 (see FIGURE 3). The signal to amplifier 24 is fed over amplitude limiters 25 of a well-known type to the amplifier 24, which is of the integrating type, here accomplished by means of a shunted capacitor 27 and impedance 26. The integrated amplified output signal from amplifier 24 is over a relay coil 28 and a sampling device 29 coupled to the electrode adjusting motor 17. The relay coil 28 belongs to a maximal relay, the contact 30 of which is series-coupled with the motor 17, and when said output signal exceeds a certain maximal value, the motor 17 is uncoupled. The amplifier 24 with auxiliary devices, including the sampling device 29 is described in application Ser. No. 262,707 (now abandoned), filed Mar. 4, 1963.

A value corresponding to the furnace current I is fed over impedance 23 and conductors 31 to the input side of amplifier 14. Said value is compared with an adjustable reference value (from conductors 32 and potentiometer 33) and the difference value of said two input signals is fed to the input side of amplifier 14. The amplifier 14 (and 24) may be of a kind well-known in the art. The output side of the amplifier 14 is fed to a network consisting of two parallel coupled, oppositely directed rectifiers 34, 35, each series coupled with a relay coil 36, 37 respectively. Each of said coils co-operates with a contact (only one, 38, being shown) in a time circuit for a relay coil 39, the corresponding contact 41 of which is series coupled with a coil 40 of a time relay. Said relay has two contacts 42, 43, one series-coupled with a signal lamp 44 to a DC source, one series-coupled in the feed circuit of motor 17. (Parts 39–43 correspond to part 16 of FIGURE 3.) The control circuit of the amplifier is fed back (at 45) from the feed circuit (at 46) of motor 17 or elsewhere.

The device in accordance with FIGURE 4 acts in the following manner: When a current error occurs, the electrode motor 17 and electrode 19 are regulated by amplifier 24 as described in application Ser. No. 262,707 (now abandoned). The error signal is fed over 31 to the input side of amplifier 14, the output signal of which is fed over rectifiers 34, 35, to the coils 36, 37, depending on whether the error is + or −. A certain error signal actuates coil 37 and thus contact 38 is closed, and after a delay (see the delay circuit with capacitor 47 at contact 39) contact 41 is also closed by coil 39. The time delay is dependent on the values of capacitance 47 and the other members in said circuit. After the closing of contact 41 the lamp circuit(42, 44) is closed and (possibly) the motor circuit is opened at 43.

If said error signal disappears before the time delay of coil 38 plus the time delay of circuit 39–47, contact 38 is reopened and after a while also contact 41, and the lamp 44 is not lit and contact 43 is kept closed.

If the error signal last longer, lamp 44 is lit and (possibly) motor 17 is stopped by means of the opening contact 43.

The object of the invention may be used at the same time with other electrode regulating devices and may in a suitable way be on-and-off connected. The range of application is not limited to certain types of electrode furnaces but may be used with all types, where extra long duration or amount of an electrode movement may involve drawbacks and signify an operating condition which demands special measures, which the normal regulating equipment is not capable of carrying out.

While we have described herein one embodiment of our invention, we wish it to be understood that we do not intend to limit ourselves thereby except within the scope of the claims hereto or hereinafter appended.

We claim:

1. Automatic control means for an arc furnace comprising means for measuring a variable magnitude of the furnace, an adjusting motor for at least one of the electrodes, control means for said motor, an amplifier, a reference magnitude supply means, means connecting said reference means and said measuring means to said amplifier, said amplifier emitting signals depending on the difference between the output signals from said reference and said measuring means, time-delay means connecting said amplifier with said motor control means and including means to furnish a continuous output signal from said amplifier when the measured value is greater than the reference value and means to supply a continuous output signal from said amplifier when the measured value is smaller than the reference value, said time-delay means including means responsive to both said signals for starting said time-delay means, said time-delay means including means to stop the operation of the motor after a predetermined period if said signal, dependent upon said difference between said magnitudes, persists for said predetermined period.

2. Automatic control means for an arc furnace, comprising means for measuring a variable magnitude of the furnace, an adjusting motor for at least one of the electrodes, control means for said motor, an amplifier, a reference magnitude supply means, means connecting said reference means and said measuring means to said amplifier, said amplifier emitting signals depending on the difference between the output signals from said reference and said measuring means signal means, time-delay means connecting said amplifier with said signal means and including means to furnish a continuous output signal from said amplifier when the measured value is greater than the reference value and means to supply a continuous output signal from said amplifier when the measured value is smaller than the reference value, said time-delay means including means responsive to both said signals for starting said time delay means, said time-delay means including means to operate said signal means after a predetermined period if said signal, dependent upon said difference between said magnitudes, persists for said predetermined period.

References Cited
UNITED STATES PATENTS

| | | | |
|---|---|---|---|
| 2,456,936 | 12/1948 | Frostick | 13—13 X |
| 2,942,045 | 6/1960 | Johnson | 13—13 |
| 2,942,138 | 6/1960 | Carr et al. | 13—13 X |
| 3,128,364 | 4/1964 | Wanttaja et al. | 314—68 X |
| 3,143,587 | 8/1964 | Buehl | 13—13 |
| 3,217,205 | 11/1965 | Bennett | 13—13 X |

BERNARD A. GILHEANY, *Primary Examiner.*

R. N. ENVALL, JR., *Assistant Examiner.*